(12) United States Patent
Oh

(10) Patent No.: US 10,115,965 B2
(45) Date of Patent: Oct. 30, 2018

(54) POSITIVE ACTIVE MATERIAL FOR RECHARGEABLE LITHIUM BATTERY, METHOD OF PREPARING SAME, AND RECHARGEABLE LITHIUM BATTERY INCLUDING SAME

(71) Applicant: SAMSUNG SDI CO., LTD., Yongin-si, Gyeonggi-do (KR)

(72) Inventor: Eun-Ok Oh, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 464 days.

(21) Appl. No.: 14/736,215

(22) Filed: Jun. 10, 2015

(65) Prior Publication Data

US 2016/0043388 A1 Feb. 11, 2016

(30) Foreign Application Priority Data

Aug. 11, 2014 (KR) ........................ 10-2014-0103979

(51) Int. Cl.

| H01M 4/36 | (2006.01) |
|---|---|
| H01M 4/58 | (2010.01) |
| H01M 4/136 | (2010.01) |
| H01M 4/1397 | (2010.01) |
| H01M 4/04 | (2006.01) |
| C01B 25/45 | (2006.01) |
| H01M 4/525 | (2010.01) |
| H01M 4/62 | (2006.01) |
| H01M 4/02 | (2006.01) |
| H01M 10/052 | (2010.01) |

(52) U.S. Cl.

CPC ............. H01M 4/366 (2013.01); C01B 25/45 (2013.01); H01M 4/0402 (2013.01); H01M 4/136 (2013.01); H01M 4/1397 (2013.01); H01M 4/525 (2013.01); H01M 4/5825 (2013.01); H01M 4/62 (2013.01); H01M 10/052 (2013.01); H01M 2004/028 (2013.01)

(58) Field of Classification Search

CPC .... H01M 4/366; H01M 4/5825; H01M 4/136; H01M 4/1397; H01M 4/525; H01M 10/052; H01M 2004/028

See application file for complete search history.

(56) References Cited

U.S. PATENT DOCUMENTS

| 8,906,553 B1 | 12/2014 | Hagh et al. |
|---|---|---|
| 2009/0081554 A1 | 3/2009 | Takada et al. |
| 2012/0009483 A1 | 1/2012 | Chu et al. |
| 2012/0021298 A1 | 1/2012 | Maeda |

FOREIGN PATENT DOCUMENTS

| CN | 102738451 A | 10/2012 |
|---|---|---|
| CN | 102760884 A | 10/2012 |
| EP | 2 448 046 A1 | 5/2012 |
| JP | 2008-226463 A | 9/2008 |
| KR | 10-2012-0010552 A | 2/2012 |
| KR | 10-2012-0046612 A | 5/2012 |
| KR | 10-2012-0100722 A | 9/2012 |
| KR | 10-2012-0127378 A | 11/2012 |

OTHER PUBLICATIONS

English Machine Translation of CN 102738451 A dated Oct. 17, 2012, listed above (11 pages).
EPO Office Action dated Oct. 6, 2016, for corresponding European Patent Application No. 15180385.5 (7 pages).
Zuxiang, L. et al., Fast Ion Conductors of Nasicon Structure, Scientia Sinica (Series A), Aug. 1984, pp. 889-896, vol. 27, No. 6, Shanghai Institute of Ceramics Chemistry and Technology, Academia Sinica, China.
Aono, H. et al., Ionic Conductivity of the Lithium Titanium Phosphate ($Li_{1+x}M_xTi_{2-x}(PO_4)_3$, M=Al, Sc, Y, and La) Systems, J. Electrochem. Soc., Feb. 1989, pp. 590-591, vol. 136, No. 2, The Electrochemical Society, Inc.
Patent Abstracts of Japan and Machine English Translation of Japanese Patent Publication No. 2008-226463, dated Sep. 25, 2008, 34 Pages.
EPO Search Report dated Sep. 28, 2015, for corresponding European Patent application 15180385.5, (10 pages).
Aono, H., et al, *Ionic Conductivity of Solid Electrolytes Based on Lithium Titanium Phosphate*, Journal of the Electrochemical Society, vol. 137, No. 4, Apr. 2, 1990, pp. 1023-1027, XP055212390.
Arbi, K., et al, *Lithium Mobility in $Li_{1.2}Ti_{1.8}R_{0.2}(PO_4)_3$ Compounds (R=Al, Ga, Sc, In) as Followed by NMR and Impedance Spectroscopy*, Chemistry of Materials, vol. 16, No. 2, Dec. 25, 2004, pp. 255-262, XP055212146.
Hamdoune, S., et al, *Ionic Conductivity and Crystal Structure of $Li_{1+x}Ti_{2-x}In_xP_3O_{12}$*, Solid State Ionics, Jan. 1, 1986, pp. 587-591, XP055212187.
Kobayashi, Yo., et al, *High-Performance Genuine Lithium Polymer Battery Obtained by Fine-Ceramic-Electrolyte Coating of $LiCoO_2$*, Journal of the Electrochemical Society, vol. 152, No. 10, Aug. 22, 2005, pp. A1985-A1988, XP055212125.
Orliukas, A.F., et al, *Structure and broadband impedance spectroscopy of $Li_{1.3}Al_yY_{x-y}Ti_{1.7}(PO_4)_3(x=0.3; y=0.1, 0.2)$ solid electrolyte ceramics*, Solid State Ionics, vol. 225, Jun. 5, 2012, pp. 620-625, XP055212127.

(Continued)

Primary Examiner — Laura Weiner
(74) Attorney, Agent, or Firm — Lewis Roca Rothgerber Christie LLP

(57) ABSTRACT

A positive active material for a rechargeable lithium battery including a core including a compound being capable of intercalating and deintercalating lithium; and the lithium metal phosphate positioned on the surface of the core, wherein the lithium metal phosphate is represented by Chemical Formula 1, a method of preparing the same, and a rechargeable lithium battery including the same.

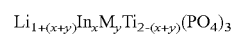

Chemical Formula 1

In Chemical Formula 1, M, x and y are the same as defined in the detailed description.

8 Claims, 12 Drawing Sheets

(56) References Cited

OTHER PUBLICATIONS

Kazakevicius, E., et al, *Preparation and characterization of $Li_{1+x}Al_ySc_{x-y}Ti_{2-x}(PO_4)_3(x=0.3, y=0.1, 0.15, 0.2)$ ceramics*, Solid State Ionics, vol. 188, No. 1, Dec. 22, 2010, pp. 73-77, XP055212138.
Wu, X., et al, *Synthesis and characterization of $Li_{1.3}Al_{0.3}Ti_{1.7}(PO_4)_3$-coated $LiMn_2O_4$ by wet chemical route*, Rare Metals, vol. 28, No. 2, Mar. 15, 2009, pp. 122-126, XP055212158.
EPO Office Action dated Dec. 19, 2017, for corresponding European Patent Application No. 15180385.5 (7 pages).

POSITIVE ACTIVE MATERIAL FOR RECHARGEABLE LITHIUM BATTERY, METHOD OF PREPARING SAME, AND RECHARGEABLE LITHIUM BATTERY INCLUDING SAME

CROSS-REFERENCE TO RELATED APPLICATION

This application claims priority to and the benefit of Korean Patent Application No. 10-2014-0103979, filed in the Korean Intellectual Property Office on Aug. 11, 2014, the entire content of which is incorporated herein by reference.

BACKGROUND

1. Field

A positive active material for a rechargeable lithium battery, a method of preparing the same, and a rechargeable lithium battery including the same are disclosed.

2. Description of the Related Art

A rechargeable lithium battery has recently drawn attention as a power source for small portable electronic devices. It uses an organic electrolyte solution and thereby, has twice as high discharge voltage as a related art battery using an alkali aqueous solution and accordingly, has a high energy density.

This rechargeable lithium battery is used by injecting an electrolyte into an electrode assembly including a positive electrode including a positive active material that can intercalate and deintercalate lithium, and a negative electrode including a negative active material that can intercalate and deintercalate lithium.

For the positive active material, a composite metal oxide such as $LiCoO_2$, $LiMn_2O_4$, $LiNiO_2$, $LiNi_{1-x}Co_xO_2$ (0<x<1), $LiMnO_2$, and the like has been used. $LiNiO_2$ among the positive active materials has high charge capacity but is difficult to synthesize, while an Mn-based active material such as $LiMn_2O_4$, $LiMnO_2$, and the like is easy to synthesize, relatively inexpensive, and less of an environmental contaminate; but $LiMnO_2$ has small capacity. In contrast, $LiCoO_2$ shows electrical conductivity of about $10^{-2}$ S/cm to 1 S/cm at room temperature, high battery voltage, and excellent electrode characteristics and thus, has been widely used; but $LiCoO_2$ has low stability during high-rate charge and discharge.

Accordingly, developments for new material substituted with the positive active material having shortcomings related to electrochemical performance and stability have been actively made.

SUMMARY

An aspect of an embodiment is directed toward a positive active material for a rechargeable lithium battery having improved electrochemical performance (e.g., high cycle-life characteristic and rate capability, excellent stability, etc.).

Another aspect of an embodiment is directed toward a method of preparing the positive active material.

Another aspect of an embodiment is directed toward a rechargeable lithium battery including the positive active material.

One embodiment provides a positive active material for a rechargeable lithium battery including a core including a compound being capable of intercalating and deintercalating lithium; and the lithium metal phosphate positioned on the surface of the core, wherein the lithium metal phosphate is different from the compound being capable of intercalating and deintercalating lithium and is represented by the following Chemical Formula 1.

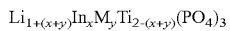   Chemical Formula 1

In Chemical Formula 1, M is Al, Y, Sc, Mg, V, Cr, Mn, Fe, Ga, Lu, Cr, La, Ge, or a combination thereof, 0<x<2, and 0≤y≤1.5.

The lithium metal phosphate may include a compound represented by Chemical Formula 2, a compound represented by Chemical Formula 3, or a combination thereof.

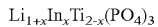   Chemical Formula 2

In Chemical Formula 2, 0.3≤x<1.

   Chemical Formula 3

In Chemical Formula 3, M is Al, Y, Sc, Mg, V, Cr, Mn, Fe, Ga, Lu, Cr, La, Ge, or a combination thereof, 0<x≤0.5, and 0<y≤1.5.

The lithium metal phosphate may be attached to the surface of the core in a shape of an island.

The lithium metal phosphate may be included in an amount of about 0.01 parts by weight to about 20 parts by weight based on 100 parts by weight of the compound being capable of intercalating and deintercalating lithium.

The compound being capable of intercalating and deintercalating lithium may be a nickel-based oxide, and the nickel-based oxide may be a lithium nickel cobalt oxide, a lithium nickel cobalt aluminum oxide, a lithium nickel cobalt manganese oxide or a combination thereof.

Another embodiment provides a method of preparing the positive active material for a rechargeable lithium battery that includes mixing a lithium-containing compound, an indium-containing compound, a titanium-containing compound, a phosphate salt, a solvent and optionally a compound including Al, Y, Sc, Mg, V, Cr, Mn, Fe, Ga, Lu, Cr, La, Ge or a combination thereof to prepare a solution including the lithium metal phosphate represented by the above Chemical Formula 1; adding a compound being capable of intercalating and deintercalating lithium to the solution including the lithium metal phosphate to obtain a mixture; and drying and firing the mixture.

Another embodiment provides a rechargeable lithium battery including the positive active material.

Other embodiments are included in the following detailed description.

The positive active material according to one or more embodiments may realize a rechargeable lithium battery having improved electrochemical performance (e.g., high cycle-life characteristic and rate capability, excellent stability, etc.).

DETAILED DESCRIPTION

Figure 1:
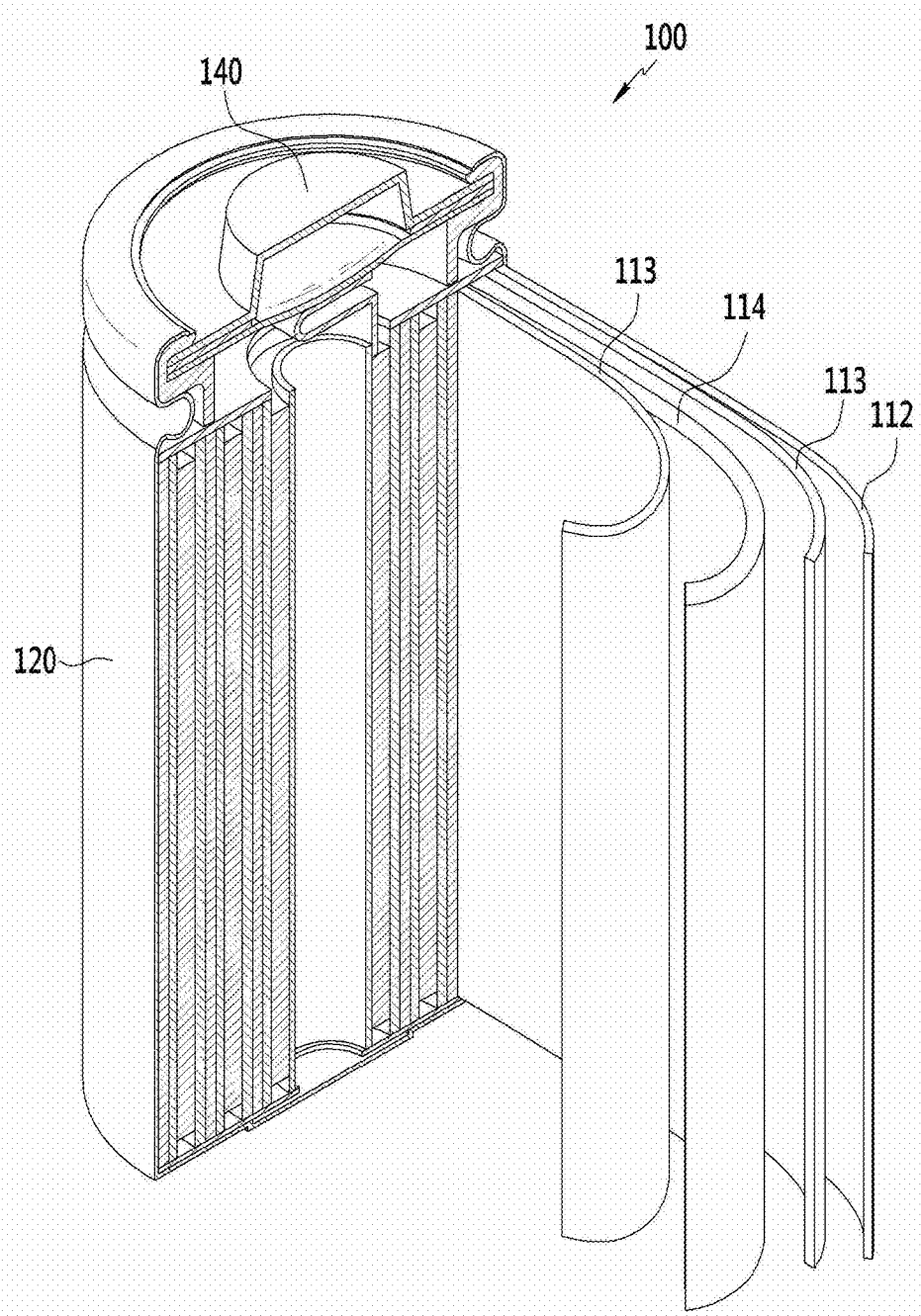
FIG. 1 is a schematic view showing a rechargeable lithium battery according to one embodiment.

Hereinafter, embodiments are described in more detail. However, these embodiments are exemplary, and this disclosure is not limited thereto. Expressions such as "may" when describing embodiments of the present invention refers to "one or more embodiments of the present invention." Also, the term "exemplary" is intended to refer to an example or illustration. It will be understood that when an element or layer is referred to as being "on", "connected to", "coupled to", "attached to" or "adjacent to" another element or layer, it can be directly on, connected to, coupled to, attached to or adjacent to the other element or layer, or one or more intervening elements or layers may be present. In contrast, when an element or layer is referred to as being "directly on," "directly connected to", "directly coupled to", "directly attached to" or "immediately adjacent to" another element or layer, there are no intervening elements or layers present. As used herein, the term "substantially," "about," and similar terms are used as terms of approximation and not as terms of degree, and are intended to account for the inherent deviations in measured or calculated values that would be recognized by those of ordinary skill in the art. As used herein, the terms "use," "using," and "used" may be considered synonymous with the terms "utilize," "utilizing," and "utilized," respectively.

Hereinafter, a positive active material for a rechargeable lithium battery according to one embodiment is described.

The positive active material according to the present embodiment includes a core including a compound being capable of intercalating and deintercalating lithium and the lithium metal phosphate positioned on the surface of the core.

The lithium metal phosphate is different from the compound being capable of intercalating and deintercalating lithium, and may be specifically represented by Chemical Formula 1.

Chemical Formula 1

In Chemical Formula 1, M is Al, Y, Sc, Mg, V, Cr, Mn, Fe, Ga, Lu, Cr, La, Ge, or a combination thereof, 0<x<2, and 0≤y≤1.5.

The lithium metal phosphate represented by the above Chemical Formula 1 is a compound having a NASICON (sodium (Na) Super Ionic Conductor) structure, and has high ion conductivity. When such as a positive active material including lithium metal phosphate positioned on the surface of the core is applied to a rechargeable lithium battery, resistance at the interface between the lithium metal phosphate and the core during an electrochemical reaction may be reduced or minimized and a side reaction between an electrolyte and a positive active material may be suppressed and battery performance such as cycle-life characteristic and rate capability may be improved and/or thermal stability may be ensured.

The lithium metal phosphate represented by Chemical Formula 1 may be specifically a compound represented by Chemical Formula 2, a compound represented Chemical Formula 3, or a combination thereof. Among them, for example, the compound represented by Chemical Formula 3 where a part of indium (In) is substituted with an M element may be used. Here, the compound represented by Chemical Formula 3 produces a vacancy during ion exchange according to the additional M (the additional M (metal) element), and ion conductivity may be further improved.

Chemical Formula 2

In Chemical Formula 2, 0.3≤x<1.

Chemical Formula 3

In Chemical Formula 3, M is Al, Y, Sc, Mg, V, Cr, Mn, Fe, Ga, Lu, Cr, La, Ge, or a combination thereof, 0<x≤0.5, and 0<y≤1.5.

The lithium metal phosphate positioned on the surface of the core may be specifically attached to the surface of the core in a shape of an island.

The lithium metal phosphate may be included in an amount of about 0.01 parts by weight to about 20 parts by weight, for example, about 0.01 parts by weight to about 10 parts by weight, or about 0.1 parts by weight to about 2 parts by weight based on 100 parts by weight of the compound being capable of intercalating and deintercalating lithium. When the lithium metal phosphate is attached to or on the surface of the core within the amount range, a rechargeable lithium battery having improved cycle-life characteristic and rate capability and improved stability may be realized.

The compound being capable of intercalating and deintercalating lithium for the core material may be a composite oxide of lithium and at least one of cobalt, manganese, nickel, or a combination thereof. Among them, a nickel-based oxide may be specifically used. The nickel-based oxide may include a lithium nickel cobalt oxide, a lithium nickel cobalt aluminum oxide, a lithium nickel cobalt manganese oxide, or a combination thereof.

The lithium metal phosphate positioned on the surface of the core includes a trivalent element, indium (In), as shown in Chemical Formula 1. Since the indium has high ion conductivity and a large ion radius, a c-axis value of the lattice parameters of the lithium metal phosphate increases, and thus the lithium metal phosphate may be desirably applied with an active material including nickel (Ni) having a relatively large c-axis length. In other words, such a lithium metal phosphate including indium (In) having high ion conductivity and large ion radius may increase or maximize resistance decrease while it matches an oxygen layer of the core material including nickel (Ni) at a ratio of 1:1 and may ensure excellent electrochemical performance and stability of the nickel-based oxide due to decrease of a side reaction with an electrolyte.

Accordingly, the lithium metal phosphate may be desirably used with a nickel-based oxide as the core material.

Hereinafter, a method of preparing the positive active material for a rechargeable lithium battery according to another embodiment is described.

A method of preparing the positive active material according to the present embodiment includes mixing a lithium-containing compound, an indium-containing compound, a titanium-containing compound, a phosphate salt, a solvent and optionally a compound including Al, Y, Sc, Mg, V, Cr, Mn, Fe, Ga, Lu, Cr, La, Ge or a combination thereof to prepare a solution including the lithium metal phosphate represented by Chemical Formula 1; adding a compound being capable of intercalating and deintercalating lithium to the solution including the lithium metal phosphate to obtain a mixture; and drying and firing the mixture.

In the method, after mixing the lithium-containing compound, the indium-containing compound, the titanium-containing compound, the phosphate salt, the solvent, and optionally the compound including Al, Y, Sc, Mg, V, Cr, Mn, Fe, Ga, Lu, Cr, La, Ge or a combination thereof, the resulting mixture may be further heat-treated. The heat-treatment may be performed at about 650° C. to 950° C., and preferably about 700° C. to 900° C. When the temperature for the heat-treatment is within the above range, a final product having a desired NASICON structure having a desirable size and without side products may be formed.

The lithium-containing compound may include lithium acetate hydrate, lithium nitrate hydrate, and/or the like; the indium-containing compound may include indium acetate, indium nitrate, indium acetylacetonate, and/or the like; the titanium-containing compound may include a titanium isopropoxide, titanium butoxide, a titanium acetylacetonate, and/or the like; and the phosphate salt may include $NH_4H_2PO_4$, $(NH_4)_2HPO_4$, $Li_3PO_4$, and/or the like. The compound including Al, Y, Sc, Mg, V, Cr, Mn, Fe, Ga, Lu, Cr, La, Ge, or a combination thereof may be nitrate hydrate and/or acetate hydrate of Al, Y, Sc, Mg, V, Cr, Mn, Fe, Ga, Lu, Cr, La, Ge, or a combination thereof. The solvent may be water, ethanol, isopropylalcohol, acetone, acetylacetonate, ethylene glycol, butanol, and/or the like.

Each raw material may be mixed in an appropriate mole ratio to obtain a stoichiometric ratio of the lithium metal phosphate represented by the above Chemical Formula 1.

The mixture may be dried at about 100° C. to about 150° C.

The mixture may be fired at about 600° C. to about 1100° C., for example, about 650° C. to about 950° C. The firing may be performed under air, or an inert gas atmosphere $N_2$ and the like for about 1 hour to about 12 hours. When being fired within the temperature range, a compound having a stable NASICON structure may be obtained.

Hereinafter, a rechargeable lithium battery including the above positive active material according to another embodiment is described with reference with FIG. 1.

FIG. 1 is a schematic view showing a rechargeable lithium battery according to one embodiment.

Referring to FIG. 1, a rechargeable lithium battery 100 according to one embodiment includes a positive electrode 114, a negative electrode 112 facing the positive electrode 114, a separator 113 interposed between the negative electrode 112 and the positive electrode 114, an electrolyte impregnating into the positive electrode 114, the negative electrode 112 and the separator 113, a battery case 120, and a sealing member 140 sealing the battery case 120.

The positive electrode 114 includes a current collector and a positive active material layer formed on the current collector. The positive active material layer includes a positive active material, binder and optionally a conductive material.

The current collector may use Al, but is not limited thereto.

The positive active material is the same as described above. The positive active material may realize a rechargeable lithium battery having improved electrochemical performance (e.g., high cycle-life characteristic and rate capability, excellent thermal stability, etc.).

The binder improves binding properties of positive active material particles with one another and with a current collector, and specific examples thereof may be polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material improves electrical conductivity of an electrode. Any electrically conductive material may be used as a conductive material, unless it causes a chemical change. The conductive material may be natural graphite; artificial graphite; carbon black; acetylene black; ketjen black; a carbon fiber; a metal powder and/or metal fiber of a copper, nickel, aluminum, silver, and/or the like; a conductive material such as a polyphenylene derivative; and/or the like.

The negative electrode 112 includes a current collector and a negative active material layer formed on the current collector.

The current collector may be a copper foil, but is not limited thereto.

The negative active material layer includes a negative active material, a binder and optionally a conductive material.

The negative active material includes a material that reversibly intercalates/deintercalates lithium ions, lithium metal, lithium metal alloy, a material being capable of doping and dedoping lithium, a transition metal oxide, or a combination thereof.

The material that reversibly intercalates/deintercalates lithium ions may be a carbon material, and the carbon material may be crystalline carbon, amorphous carbon, or a combination thereof. The crystalline carbon may be non-shaped, or may be sheet, flake, spherical, or fiber shaped natural graphite or artificial graphite. The amorphous carbon may be a soft carbon, a hard carbon, mesophase pitch carbonized products, fired coke, and/or the like. The lithium metal alloy may be an alloy of lithium with a metal of Na, K, Rb, Cs, Fr, Be, Mg, Ca, Sr, Si, Sb, Pb, In, Zn, Ba, Ra, Ge, Al, and/or Sn. The material being capable of doping and dedoping lithium may be Si, $SiO_x$ (0<x<2), a Si—C composite, a Si—Y alloy, Sn, $SnO_2$, a Sn—C composite, a Sn—Y, and/or the like, and at least one thereof may be used with $SiO_2$. The element, Y may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po and a combination thereof. The transition metal oxide may be a vanadium oxide, a lithium vanadium oxide, and/or the like.

The binder improves binding properties of negative active material particles with one another and with a current collector, and examples thereof may be polyvinyl alcohol, carboxylmethyl cellulose, hydroxypropyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material improves electrical conductivity of an electrode. Any electrically conductive material may be used as a conductive material, unless it causes a chemical change. The electrically conductive material may be a carbon-based material (such as natural graphite, artificial graphite, carbon black, acetylene black, ketjen black, a carbon fiber or the like); a metal-based material (such as a metal powder, a metal fiber, or the like of copper, nickel, aluminum, silver, and/or the like); a conductive polymer (such as a polyphenylene derivative or the like); or a mixture thereof.

The negative electrode 112 and the positive electrode 114 are prepared by mixing each active material, a conductive material and a binder in a solvent to prepare an active material composition, and coating the composition on a current collector.

The electrode preparation method is well known, and thus is not described in more detail in the present specification. The solvent includes N-methylpyrrolidone and the like, but is not limited thereto.

The electrolyte solution includes a non-aqueous organic solvent and a lithium salt.

The non-aqueous organic solvent serves as a medium for transmitting ions taking part in the electrochemical reaction of a battery. The non-aqueous organic solvent may include a carbonate-based, ester-based, ether-based, ketone-based, alcohol-based, or aprotic solvent.

The carbonate-based solvent may include, for example dimethyl carbonate (DMC), diethyl carbonate (DEC), dipropyl carbonate (DPC), methylpropyl carbonate (MPC), ethylpropyl carbonate (EPC), methylethyl carbonate (MEC), ethylmethyl carbonate (EMC), ethylene carbonate (EC), propylene carbonate (PC), butylene carbonate (BC), and/or the like.

Particularly, when a linear carbonate compound and a cyclic carbonate compound are mixed, a solvent having a high dielectric constant and a low viscosity may be provided. Herein, the cyclic carbonate compound and linear carbonate compound may be mixed together in a volume ratio ranging from about 1:1 to about 1:9.

The ester-based solvent may include, for example methylacetate, ethylacetate, n-propylacetate, dimethylacetate, methylpropionate, ethylpropionate, γ-butyrolactone, decanolide, valerolactone, mevalonolactone, caprolactone, and/or the like. The ether-based solvent may include, for example dibutylether, tetraglyme, diglyme, dimethoxyethane, 2-methyltetrahydrofuran, tetrahydrofuran, and/or the like. The ketone-based solvent may include cyclohexanone and/or the like. The alcohol-based solvent may include ethyl alcohol, isopropyl alcohol, and/or the like.

The non-aqueous organic solvent may be used singularly or in a mixture, and when the organic solvent is used in a mixture, the mixture ratio may be controlled in accordance with a desirable battery performance.

The non-aqueous electrolyte solution may further include an overcharge inhibitor additive such as ethylenecarbonate, pyrocarbonate, or the like.

The lithium salt is dissolved in an organic solvent, supplies lithium ions in a battery, basically operates the rechargeable lithium battery, and improves lithium ion transportation between positive and negative electrodes therein.

The lithium salt may be $LiPF_6$; $LiBF_4$; $LiSbF_6$; $LiAsF_6$; $LiN(SO_3C_2F_5)_2$; $LiC_4F_9SO_3$; $LiClO_4$; $LiAlO_2$; $LiAlCl_4$; $LiN(C_yF_{2y+1}SO_2)(C_yF_{2y+1}SO_2)$, wherein, x and y are natural numbers, and e.g., an integer of 1 to 20; LiCl; LiI; LiB$(C_2O_4)_2$ (lithium bis(oxalato) borate, LiBOB); or a combination thereof.

The lithium salt may be used in a concentration ranging from about 0.1 M to about 2.0 M. When the lithium salt is included within the above concentration range, an electrolyte solution may have excellent performance and lithium ion mobility due to desired electrolyte conductivity and viscosity.

The separator 113 may include any suitable materials commonly used in the conventional lithium battery as long as there is separation of (e.g., electron or electrical separation of) the negative electrode 112 from the positive electrode 114 and a suitable transporting passage of lithium ion between the negative electrode 112 and the positive electrode 114 is provided. In other words, it may have a low resistance to ion transport and an excellent impregnation for electrolyte solution. For example, it may be selected from glass fiber, polyester, polyethylene, polypropylene, polytetrafluoroethylene (PTFE), and a combination thereof. It may have a form of a non-woven fabric or a woven fabric. For example, for the lithium ion battery, polyolefin-based polymer separator (such as polyethylene, polypropylene or the like) is mainly used (e.g., is used as a major component). In order to ensure the heat resistance or mechanical strength, a coated separator including a ceramic component and/or a polymer material may be used. Selectively, it may have a mono-layered or multi-layered structure.

Hereinafter, the embodiments are illustrated in more detail with reference to examples. However, these examples are exemplary, and the present disclosure is not limited thereto.

Furthermore, what is not described in this disclosure may be sufficiently understood by those who have knowledge in this field and will not be illustrated here.

Preparation of Lithium Metal Phosphate

Preparation Example 1: Preparation of LITP

A mixture obtained by mixing $CH_3COOLi.2H_2O$, $In(C_2H_3O_2)_3$, $Ti[OCH(CH_3)_2]_4$ and $NH_4H_2PO_4$ in a mole ratio of a final material was mixed with a mixed solvent obtained by mixing water, ethanol and isopropylalcohol (a weight ratio of 8:38:54) and the mixture was heat-treated at 750° C., thereby preparing a solution containing $Li_{1.4}In_{0.4}Ti_{1.6}(PO_4)_3$ (LITP).

Preparation Example 2: Preparation of LIATP

A mixture obtained by mixing $CH_3COOLi.2H_2O$, $In(C_2H_3O_2)_3$, $Al(NO_3)_3.9H_2O$, $Ti[OCH(CH_3)_2]_4$ and $NH_4H_2PO_4$ in a mole ratio of a final material was mixed with a mixed solvent obtained by mixing water, ethanol and isopropylalcohol (a weight ratio of 8:38:54) and the mixture was heat-treated at 750° C., thereby preparing a solution containing $Li_{1.3}In_{0.2}Al_{0.1}Ti_{1.7}(PO_4)_3$ (LIATP).

Preparation Example 3: Preparation of LIYTP

A mixture obtained by mixing $CH_3COOLi.2H_2O$, $In(C_2H_3O_2)_3$, $Y(NO_3)_3.6H_2O$, $Ti[OCH(CH_3)_2]_4$ and $NH_4H_2PO_4$ in a mole ratio of a final material was mixed with a mixed solvent obtained by mixing water, ethanol and isopropylalcohol (a weight ratio of 8:38:54) and the mixture was heat-treated at 750° C., thereby preparing a solution containing $Li_{1.3}In_{0.2}Y_{0.1}Ti_{1.7}(PO_4)_3$ (LIYTP).

Preparation Example 4: Preparation of LIMTP

A mixture obtained by mixing $CH_3COOLi.2H_2O$, $In(C_2H_3O_2)_3$, $Mg(CH_3COO)_2.4H_2O$, $Ti[OCH(CH_3)_2]_4$ and $NH_4H_2PO_4$ in a mole ratio of a final material was mixed with a mixed solvent obtained by mixing water, ethanol and isopropylalcohol (a weight ratio of 8:38:54) and the mixture was heat-treated at 750° C., thereby preparing a solution containing $Li_{1.6}In_{0.4}Mg_{0.2}Ti_{1.4}(PO_4)_3$ (LIMTP).

Preparation Example 5: Preparation of LISTP

A mixture obtained by mixing $CH_3COOLi.2H_2O$, $In(C_2H_3O_2)_3$, $Sc(CH_3COO)_3.xH_2O$, $Ti[OCH(CH_3)_2]_4$ and $NH_4H_2PO_4$ in a mole ratio of a final material was mixed with a mixed solvent obtained by mixing water, ethanol and isopropylalcohol (a weight ratio of 8:38:54) and the mixture was heat-treated at 750° C., thereby preparing a solution containing $Li_{1.3}In_{0.15}Sc_{0.15}Ti_{1.7}(PO_4)_3$.

Comparative Preparation Example 1: Preparation of LATP

A mixture obtained by mixing $CH_3COOLi.2H_2O$, $Al(NO_3)_3.9H_2O$, $Ti[OCH(CH_3)_2]_4$ and $NH_4H_2PO_4$ in a mole ratio of a final material was mixed with a mixed solvent obtained by mixing water, ethanol and isopropylalcohol (a weight ratio of 8:38:54) and the mixture was heat-treated at 750° C., thereby preparing a solution containing $Li_{1.3}Al_{0.3}Ti_{1.7}(PO_4)_3$ (LATP).

Preparation of Positive Active Material

Example 1

$LiNi_{1/3}Co_{1/3}Mn_{1/3}O_2$(NCM) was added to the LITP-containing solution according to Preparation Example 1, and the mixture was agitated, then, dried at 120° C. while still agitated, and fired at 750° C. for 120 minutes under an air gas atmosphere, thereby manufacturing the NCM coated with the LITP. Herein, the LITP was used in an amount of 1 part by weight based on 100 parts by weight of the NCM.

Example 2

NCM coated with LIATP was manufactured according to the same method as Example 1 except for using the LIATP according to Preparation Example 2 instead of the LITP according to Preparation Example 1. Herein, the LIATP was used in an amount of 1 part by weight based on 100 parts by weight of the NCM.

Example 3

NCM coated with LIYTP was manufactured according to the same method as Example 1 except for using the LIYTP according to Preparation Example 3 instead of the LITP according to Preparation Example 1. Herein, the LIYTP was used in an amount of 1 part by weight based on 100 parts by weight of the NCM.

Comparative Example 1

$LiNi_{1/3}Co_{1/3}Mn_{1/3}O_2$(NCM) was used as a positive active material.

Comparative Example 2

NCM coated with LATP was manufactured according to the same method as Example 1 except for using the LATP according to Comparative Preparation Example 1 instead of the LITP according to Preparation Example 1. Herein, the LATP was used in an amount of 1 part by weight based on 100 parts by weight of the NCM.

Example 4

$LiNi_{87.5}Co_{11}Al_{1.5}O_2$(NCA) was added to the LIATP-containing solution according to Preparation Example 2, and the mixture was agitated, dried at 120° C. while dried, and fired at 750° C. for 120 minutes under an air gas atmosphere, thereby manufacturing the NCA coated with the LIATP. Herein, the LIATP was used in an amount of 1 part by weight based on 100 parts by weight of the NCA.

Example 5

NCA coated with LIMTP was manufactured according to the same method as Example 4 except for using the LIMTP according to Preparation Example 4 instead of the LIATP according to Preparation Example 2. Herein, the LIMTP was used in an amount of 1 part by weight based on 100 parts by weight of the NCA.

Comparative Example 3

$LiNi_{87.5}Co_{11}Al_{1.5}O_2$(NCA) was used as a positive active material.

(Manufacture of Rechargeable Lithium Battery Cell)

94 wt % of each of the positive active materials according to Examples 1 to 5 and Comparative Examples 1 to 3, 3 wt % of polyvinylidene fluoride (PVDF) and 3 wt % of carbon black were dispersed into N-methyl-2-pyrrolidone, thereby preparing a slurry. The slurry was coated on a 15 μm-thick aluminum foil, dried and compressed, thereby manufacturing a positive electrode.

Then, a metal lithium was used as a counter electrode for the positive electrode, thereby manufacturing a coin-type half-cell. Herein, an electrolyte solution was prepared by mixing ethylene carbonate (EC), ethylmethyl carbonate (EMC) and diethyl carbonate (DEC) in a volume ratio of 3:6:1; dissolving 1.15 M $LiPF_6$ in the mixed solvent; and then, adding 3 parts by weight of fluoroethylenecarbonate based on 100 parts by weight of the solvent thereto.

Evaluation 1: SEM Photograph of Lithium Metal Phosphate

Figure 2A:
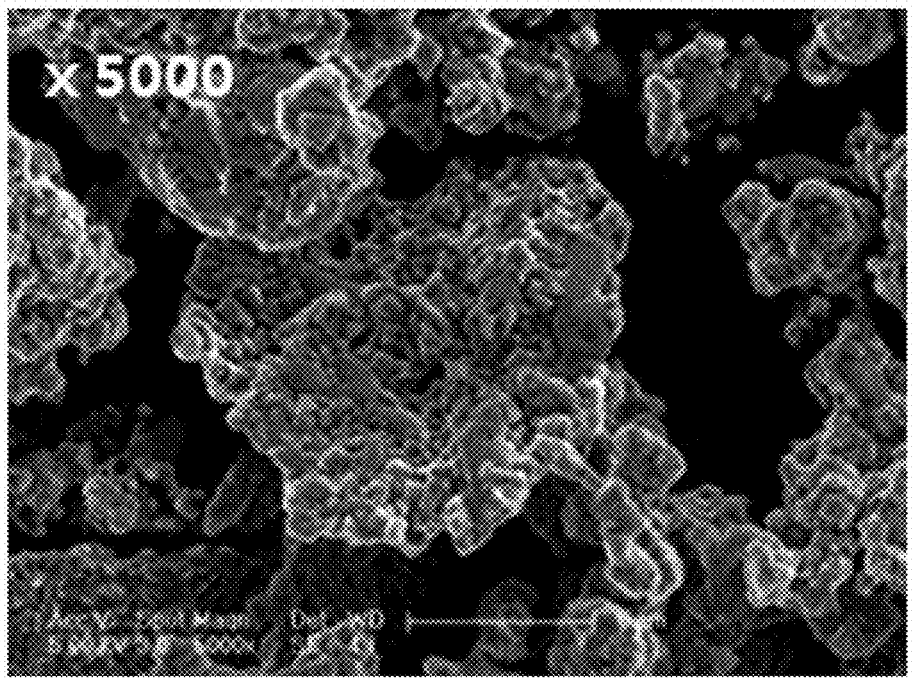
FIGS. 2A and 2B are 5,000 and 25,000 magnified scanning electron microscope (SEM) photographs of the lithium metal phosphate according to Preparation Example 1.
Figure 2B:
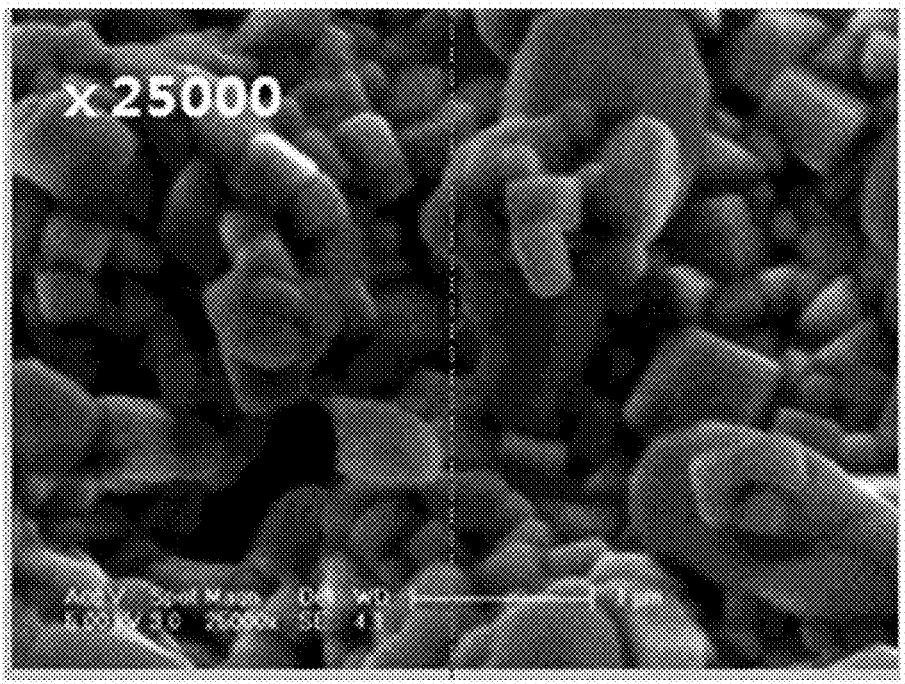

FIGS. 2A and 2B are 5,000 and 25,000 magnified scanning electron microscope (SEM) photographs of the lithium metal phosphate according to Preparation Example 1.

Referring to FIGS. 2A and 2B, lithium metal phosphate of LITP was manufactured according to the manufacturing method of Preparation Example 1.

Evaluation 2: SEM Photograph of Positive Active Material

Figure 3A:
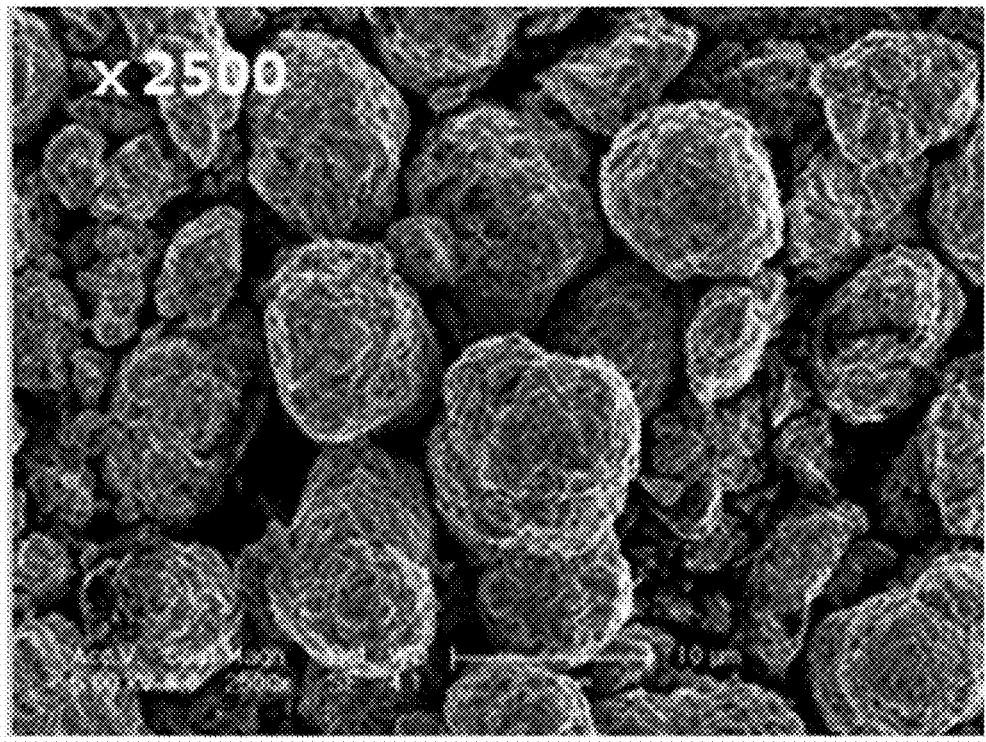
FIGS. 3A to 3C are 2,500, 5,000 and 25,000 magnified scanning electron microscope (SEM) photographs of the positive active material according to Example 1.
Figure 3B:
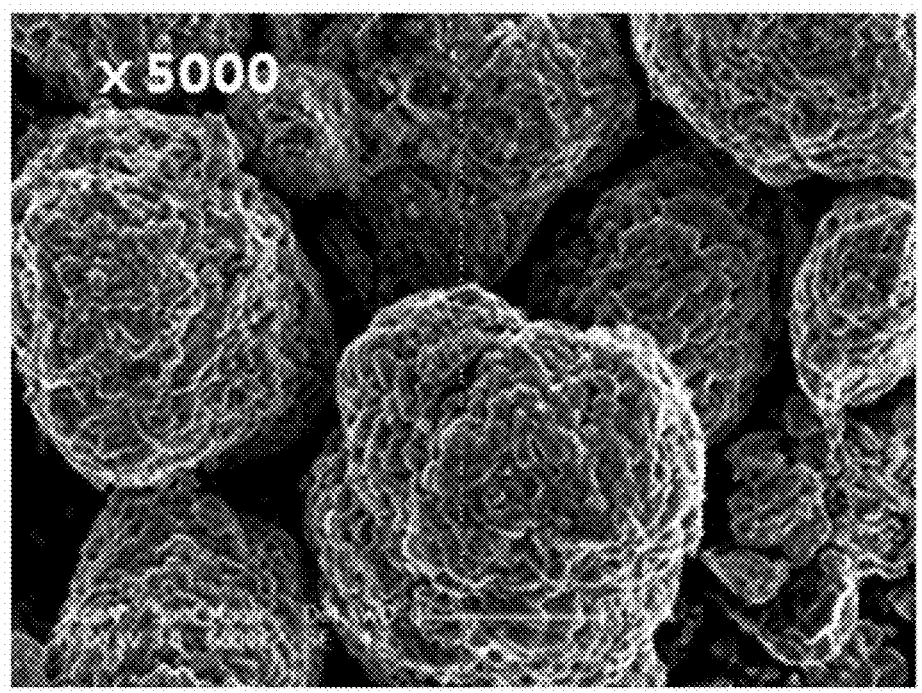
Figure 3C:
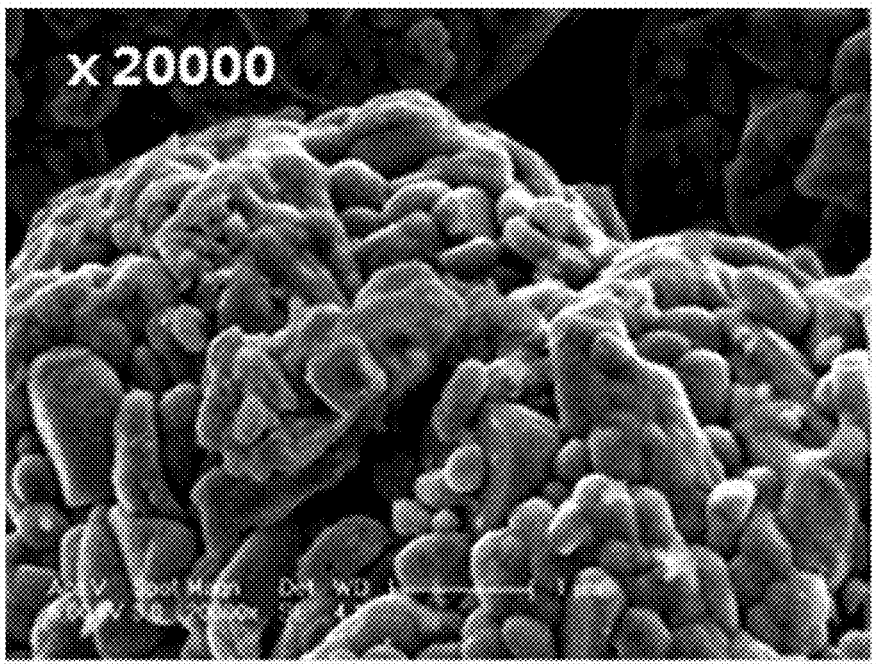

FIGS. 3A to 3C are 2,500, 5,000 and 25,000 magnified scanning electron microscope (SEM) photographs of the positive active material according to Example 1.

Referring to FIGS. 3A to 3C, the positive active material of Example 1 was formed of NCM coated with LITP on the surface.

Evaluation 3: XRD Analysis of Positive Active Material

Figure 4:
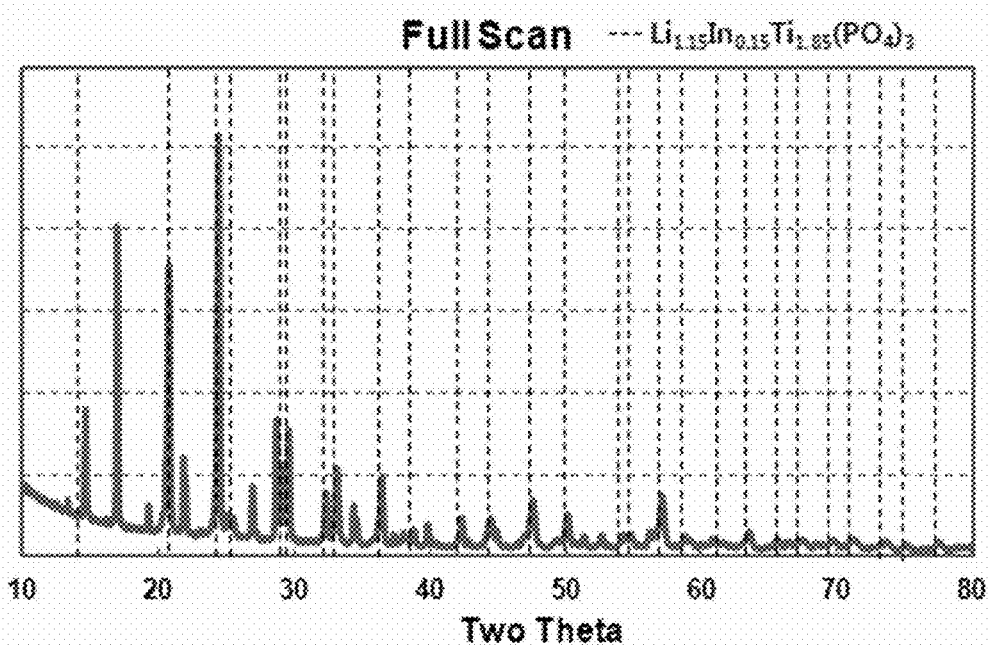
FIG. 4 is a graph showing an X-ray diffraction (XRD) analysis of the positive active material according to Example 1.

FIG. 4 is a graph showing an X-ray diffraction (XRD) analysis of the positive active material according to Example 1.

Referring to FIG. 4, a main peak appearing in a range of 23.5° to 25.5° shows that the positive active material was $Li_{1.4}In_{0.4}Ti_{1.6}(PO_4)_3$ having a NASICON structure.

Evaluation 4: DSC Analysis of Positive Active Material

Figure 5:
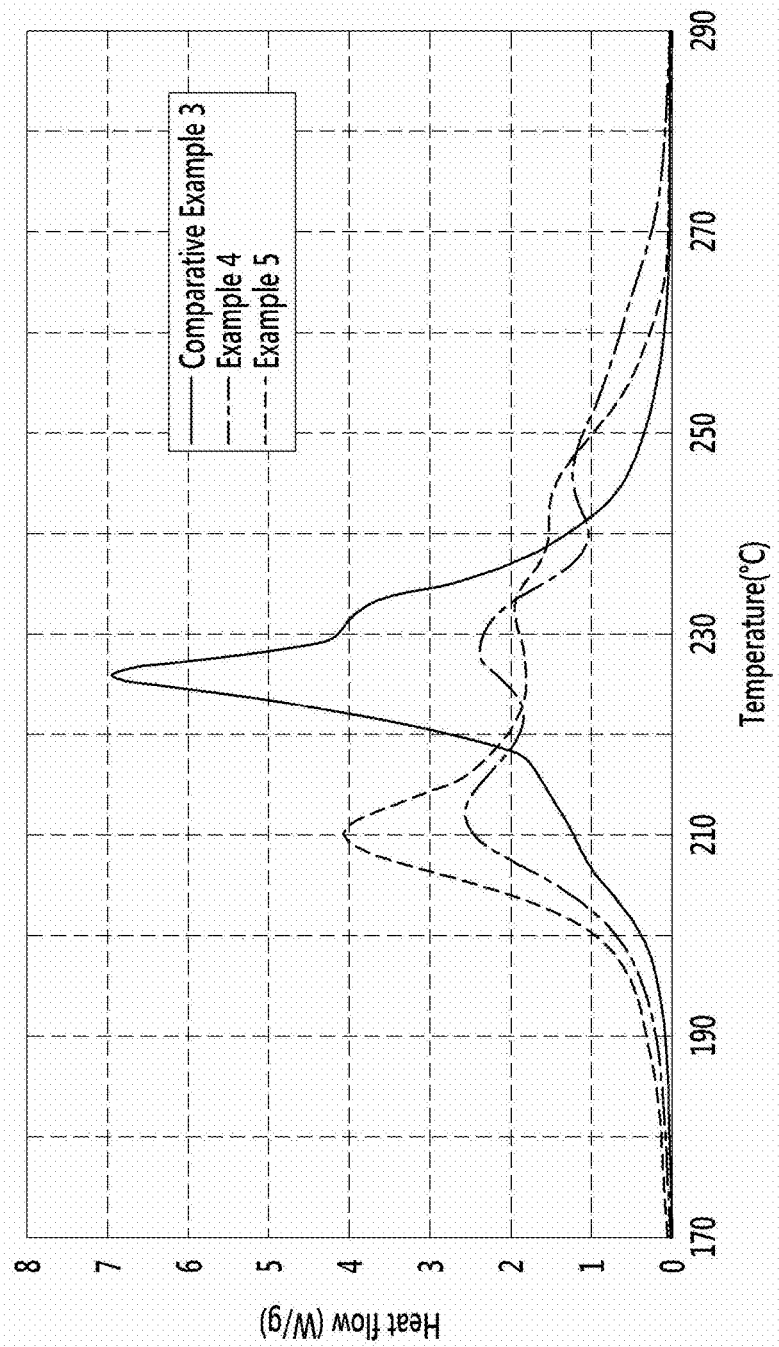
FIG. 5 is a graph showing DSC (differential scanning calorimetry) analyses of the positive active materials according to Examples 4 and 5 and Comparative Example 3.

FIG. 5 is a graph showing DSC (differential scanning calorimetry) analyses of the positive active materials according to Examples 4 and 5 and Comparative Example 3.

Referring to FIG. 5, Example 4 using the NCA coated with the LIATP as a positive active material and Example 5 using the NCA coated with the LIMTP as a positive active material showed a decreased exothermic amount compared with Comparative Example 3 using NCA as a positive active material. Accordingly, a core material coated with lithium metal phosphate including In as a positive active material contributed to better thermal safety of a rechargeable lithium battery cell compared with an uncoated core material.

Evaluation 4: Cycle-life Characteristics of Rechargeable Lithium Battery Cell

Figure 6:
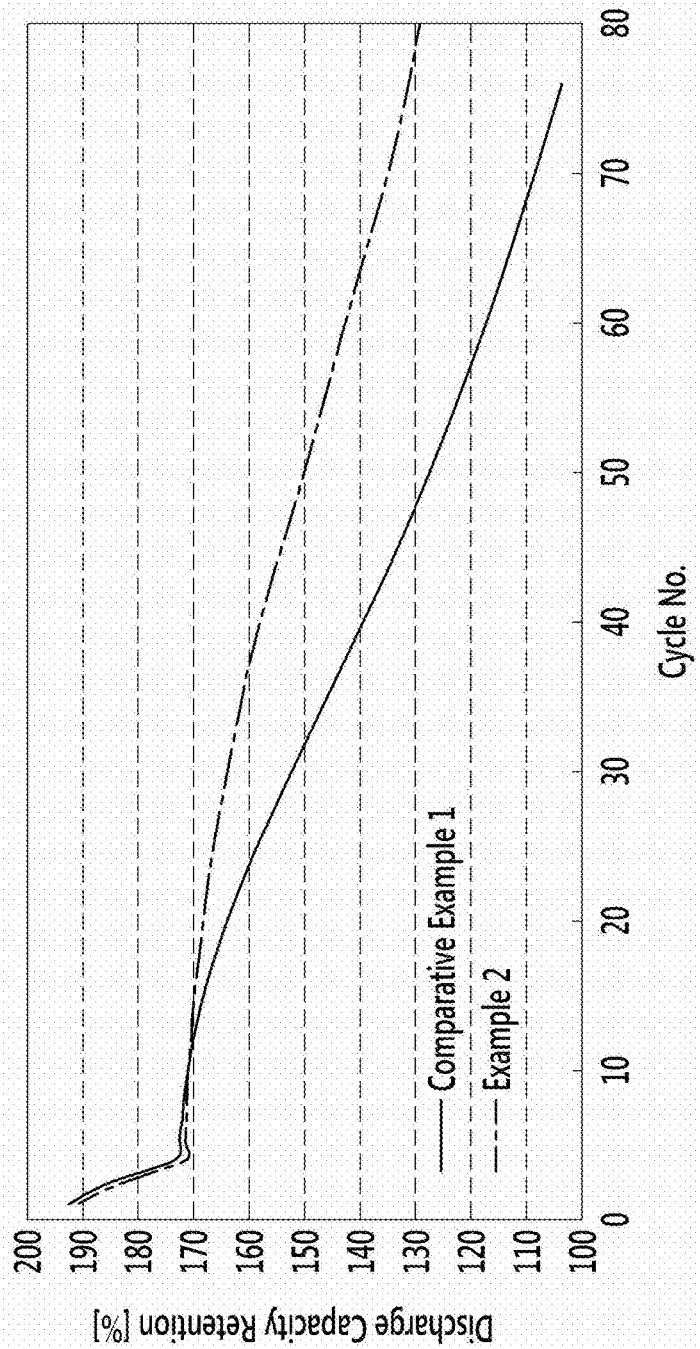
FIG. 6 is a graph showing cycle-life characteristics of rechargeable lithium battery cells including the positive active materials according to Example 2 and Comparative Example 1.
Figure 7:
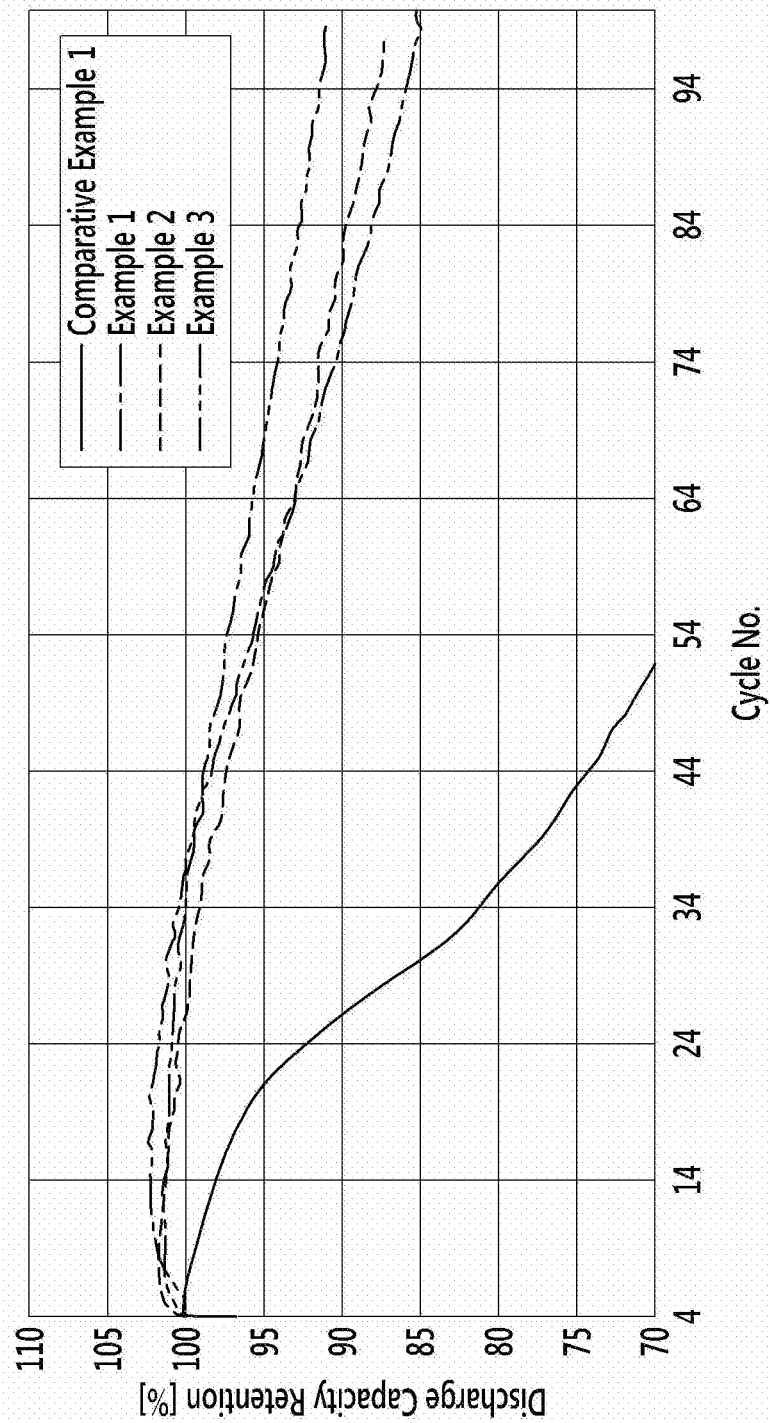
FIG. 7 is a graph showing cycle-life characteristics of rechargeable lithium battery cells including the positive active materials according to Examples 1 to 3 and Comparative Example 1.

Cycle-life characteristics of each rechargeable lithium battery cell respectively using the positive active materials according to Examples 1 to 3 and Comparative Example 1 were measured, and the results are provided in FIGS. 6 and 7.

The cycle-life characteristics of the cells were measured by charging and discharging at 0.1 once, at 0.2 C once, at 0.5 C once, and at 1 C once, and then charging and discharging at IC 100 times. The charging and discharging were performed at a cut-off of 0.05 C under a constant voltage mode.

FIG. 6 is a graph showing cycle-life characteristics of rechargeable lithium battery cells including the positive active materials according to Example 2 and Comparative Example 1. FIG. 7 is a graph showing cycle-life characteristics of the rechargeable lithium battery cells including the positive active materials according to Examples 1 to 3 and Comparative Example 1.

Referring to FIG. 6, Example 2 using the NCM coated with the LIATP as a positive active material showed excellent cycle-life characteristics compared with Comparative Example 1 using NCM. Accordingly, a rechargeable lithium battery cell using a core material coated with lithium metal phosphate including In as a positive active material shows excellent cycle-life characteristics compared with a rechargeable lithium battery cell using an uncoated core material.

Referring to FIG. 7, Example 1 using the NCM coated with the LITP as a positive active material, Example 2 using the NCM coated with the LIATP, and Example 3 using the NCM coated with the LIYTP showed excellent cycle-life characteristics compared with Comparative Example 1 using NCM. Accordingly, a rechargeable lithium battery cell using a core material coated with lithium metal phosphate including In as a positive active material showed excellent cycle-life characteristics compared with a rechargeable lithium battery cell using an uncoated core material.

Evaluation 5: Rate Capability of Cycle-Life Characteristics of Rechargeable Lithium Battery Cell Rate capability of each of the rechargeable lithium battery cells respectively using the positive active materials according to Examples 2 and 4 and Comparative Examples 2 and 3 was measured, and the results are provided in FIGS. 8 and 9.

The charge and the discharge conditions for measuring the rate capability of the cells were as below.

1. Constant-current charging at 0.1 C and at a cut-off voltage of 4.5V, constant-voltage charging to a current of 0.05 C while maintaining 4.V, and discharging at 0.1 C until the voltage reached 3V 2. Constant-current charging at 0.1 C and at a cut-off voltage of 4.5V, constant-voltage charging to a current of 0.05 C while maintaining 4.V, and discharging at 0.2 C until the voltage reached 3V.

3. Constant-current charging at 0.1 C and at a cut-off voltage of 4.5V, constant-voltage charging to a current of 0.05 C while maintaining 4.V, and discharging at 0.5 C until the voltage reached 3V.

4. Constant-current charging at 0.1 C and at a cut-off voltage of 4.5V, constant-voltage charging to a current of 0.05 C while maintaining 4.V, and discharging at 1 C until the voltage reached 3V.

5. Constant-current charging at 0.1 C and at a cut-off voltage of 4.5V, constant-voltage charging to a current of 0.05 C while maintaining 4.V, and discharging at 2 C until the voltage reached 3V.

6. Constant-current charging at 0.1 C and at a cut-off voltage of 4.5V, constant-voltage charging to a current of 0.05 C while maintaining 4.V, and discharging at 3 C until the voltage reached 3V.

7. Constant-current charging at 0.1 C and at a cut-off voltage of 4.5V, constant-voltage charging to a current of 0.05 C while maintaining 4.V, and discharging at 5 C until the voltage reached 3V.

8. Constant-current charging at 0.1 C and at a cut-off voltage of 4.5V, constant-voltage charging to a current of 0.05 C while maintaining 4.V, and discharging at 7 C until the voltage reached 3V.

Figure 8:
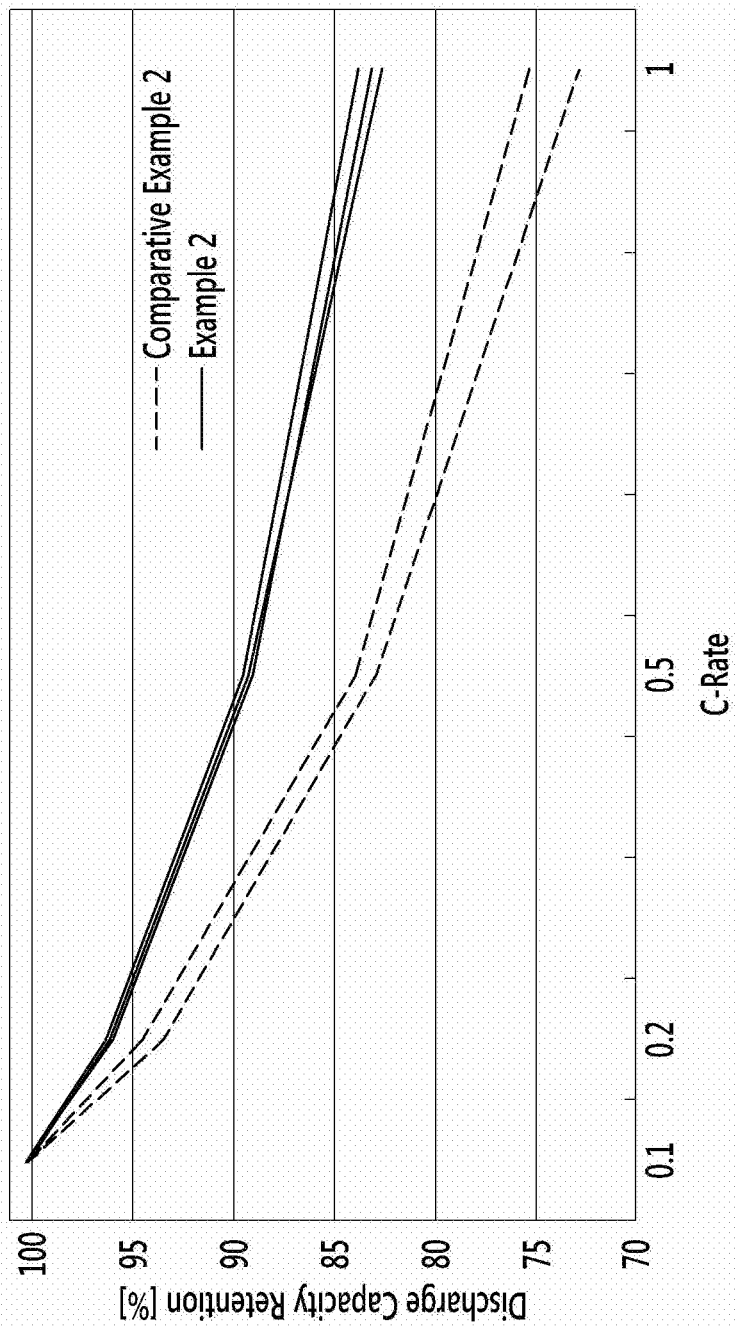
FIG. 8 is a graph showing rate capability of rechargeable lithium battery cells including the positive active materials according to Example 2 and Comparative Example 2.
Figure 9:
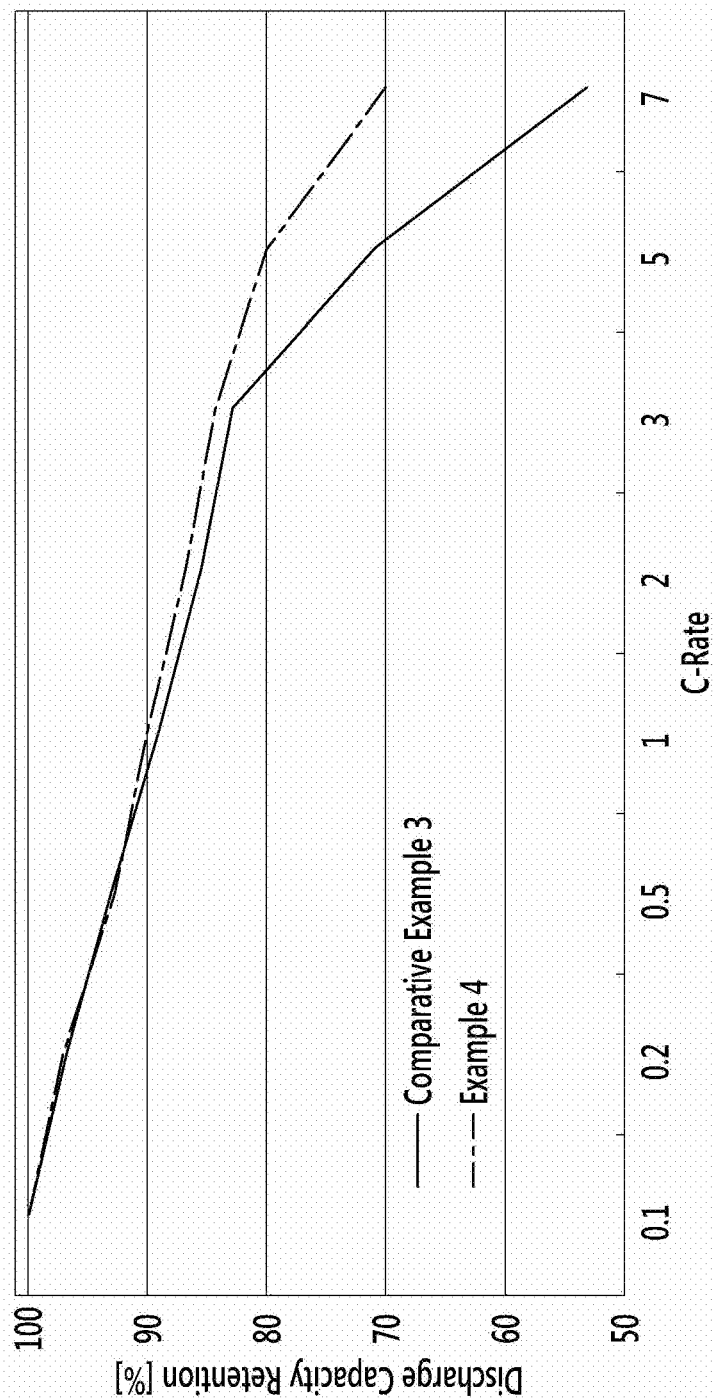
FIG. 9 is a graph showing rate capability of rechargeable lithium battery cells including the positive active materials according to Example 4 and Comparative Example 3.

FIG. 8 is a graph showing rate capability of rechargeable lithium battery cells including the positive active materials according to Example 2 and Comparative Example 2. FIG. 9 is a graph showing rate capability of rechargeable lithium battery cells including the positive active materials according to Example 4 and Comparative Example 3.

Referring to FIG. 8, Example 2 using the NCM coated with the LIATP as a positive active material showed excellent rate capability compared with Comparative Example 2 using the NCM coated with the LATP. Accordingly, a rechargeable lithium battery cell using a core material coated with lithium metal phosphate including In as a positive active material showed excellent rate capability compared with a rechargeable lithium battery cell using a core material coated with lithium metal phosphate including no In.

Referring to FIG. 9, Example 4 using the NCA coated with the LIATP as a positive active material showed excellent rate capability compared with Comparative Example 3 using NCA. Accordingly, a rechargeable lithium battery cell using a core material coated with lithium metal phosphate including In showed excellent rate capability compared with a rechargeable lithium battery cell using an uncoated core material.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A positive active material for a rechargeable lithium battery, comprising
a core comprising a compound capable of intercalating and deintercalating lithium, the compound capable of intercalating and deintercalating lithium being a nickel-based oxide; and a lithium metal phosphate on the surface of the core, the lithium metal phosphate being included in an amount of about 0.01 parts by weight to about 20 parts by weight based on 100 parts by weight of the compound capable of intercalating and deintercalating lithium, wherein the lithium metal phosphate is different from the compound capable of intercalating and deintercalating lithium and is represented by Chemical Formula 1:

$$Li_{1+(x+y)}In_xM_yTi_{2-(x+y)}(PO_4)_3 \qquad \text{Chemical Formula 1}$$

wherein, in Chemical Formula 1, M is Al, Y, Sc, Mg, V, Cr, Mn, Fe, Ga, Lu, Cr, La, Ge, or a combination thereof, 0<x<2, and 0≤y≤1.5, wherein the nickel-based oxide comprises a lithium nickel cobalt aluminum oxide, a lithium nickel cobalt manganese oxide, or a combination thereof.

2. The positive active material of claim 1, wherein the lithium metal phosphate comprises a compound represented by Chemical Formula 2, a compound represented by Chemical Formula 3, or a combination thereof:

$$Li_{1+x}In_xTi_{2-x}(PO_4)_3 \qquad \text{Chemical Formula 2}$$

wherein, in Chemical Formula 2, 0.3≤x<1, $$Li_{1+(x+y)}In_xM_yTi_{2-(x+y)}(PO_4)_3 \qquad \text{Chemical Formula 3}$$

wherein, in Chemical Formula 3, M is Al, Y, Sc, Mg, V, Cr, Mn, Fe, Ga, Lu, Cr, La, Ge, or a combination thereof, 0<x≤0.5, and 0≤y≤1.5.

3. The positive active material of claim 1, wherein the lithium metal phosphate is attached to the surface of the core in a shape of an island.

4. The positive active material of claim 1, wherein the lithium metal phosphate is included in an amount of about 0.01 parts by weight to about 10 parts by weight based on 100 parts by weight of the compound capable of intercalating and deintercalating lithium.

5. A rechargeable lithium battery comprising the positive active material of claim 1.

6. The rechargeable lithium battery of claim 5, wherein the lithium metal phosphate comprises a compound represented by Chemical Formula 2, a compound represented by Chemical Formula 3, or a combination thereof:

$$Li_{1+x}In_xTi_{2-x}(PO_4)_3 \qquad \text{Chemical Formula 2}$$

wherein, in Chemical Formula 2, 0.3≤x<1, $$Li_{1+(x+y)}In_xM_yTi_{2-(x+y)}(PO_4)_3 \qquad \text{Chemical Formula 3}$$

wherein, in Chemical Formula 3, M is Al, Y, Sc, Mg, V, Cr, Mn, Fe, Ga, Lu, Cr, La, Ge, or a combination thereof, 0<x≤0.5, and 0≤y≤1.5.

7. The rechargeable lithium battery of claim 5, wherein the lithium metal phosphate is attached to the surface of the core in a shape of an island.

8. The rechargeable lithium battery of claim 5, wherein the lithium metal phosphate is included in an amount of about 0.01 parts by weight to about 10 parts by weight based on 100 parts by weight of the compound capable of intercalating and deintercalating lithium.

* * * * *